(12) United States Patent  
Chintapalli et al.

(10) Patent No.: US 11,760,824 B2  
(45) Date of Patent: Sep. 19, 2023

(54) METHOD TO PRODUCE COLORLESS, HIGH POROSITY, TRANSPARENT POLYMER AEROGELS

(71) Applicants: PALO ALTO RESEARCH CENTER INCORPORATED, Palo Alto, CA (US); XEROX CORPORATION, Norwalk, CT (US)

(72) Inventors: Mahati Chintapalli, Mountain View, CA (US); Barkev Keoshkerian, Thornhill (CA); Alec Ho, Pasadena, CA (US); Gabriel Iftime, Dublin, CA (US); Quentin Van Overmeere, Mountain View, CA (US); Eli Bulger, Nottawa (CA)

( * ) Notice: Subject to any disclaimer, the term of this patent is extended or adjusted under 35 U.S.C. 154(b) by 291 days.

(21) Appl. No.: 17/069,611

(22) Filed: Oct. 13, 2020

(65) Prior Publication Data  
US 2021/0040256 A1 Feb. 11, 2021

Related U.S. Application Data

(62) Division of application No. 16/046,692, filed on Jul. 26, 2018, now Pat. No. 10,836,855.

(51) Int. Cl.  
C08F 293/00 (2006.01)  
C08J 9/00 (2006.01)  
B01J 13/00 (2006.01)  
C08J 3/24 (2006.01)

(52) U.S. Cl.  
CPC ....... C08F 293/005 (2013.01); B01J 13/0065 (2013.01); B01J 13/0091 (2013.01); C08J 3/24 (2013.01); C08F 2438/02 (2013.01)

(58) Field of Classification Search  
CPC .............. C08F 293/005; C08F 2438/02; C08F 2438/01; C08F 2/38; B01J 13/0065; B01J 13/0091; C08J 3/24; C08J 2201/0542; C08J 2205/026; C08J 9/286  
See application file for complete search history.

(56) References Cited

U.S. PATENT DOCUMENTS 5,723,554 A 3/1998 Fujita  
5,795,557 A 8/1998 Pajonk et al.  
5,891,971 A 4/1999 Keoshkerian et al.  
(Continued)

FOREIGN PATENT DOCUMENTS

EP 3466986 A1 4/2019  
WO 9946310 A1 9/1999  
(Continued)

OTHER PUBLICATIONS

Zu et al., "Transparent, Superflexible Doubly Cross-Linked Polyvinylpolymethylsiloxane Aerogel Superinsulators via Ambient Pressure Drying,"ACS Nano, 2018, 12, 1, 521-532. (Published Jan. 8, 2018). (Year: 2018).*

(Continued)

*Primary Examiner* — K. Boyle  
(74) *Attorney, Agent, or Firm* — Miller Nash LLP

(57) ABSTRACT

A dried polymer aerogel has a Brunauer-Emmett Teller (BET) surface area over 100 m2/g, porosity of greater than 10%, visible transparency greater than 20%, color rendering index of over 20%, and average pore size of less than 100 nm.

17 Claims, 7 Drawing Sheets

(56) References Cited

U.S. PATENT DOCUMENTS

| | | |
|---|---|---|
| 6,713,584 B1 | 3/2004 | Chisholm et al. |
| 6,716,948 B1 | 4/2004 | Klaemer et al. |
| 7,732,496 B1 | 6/2010 | Leventis |
| 8,663,742 B2 | 3/2014 | Kissel |
| 2003/0013822 A1 | 1/2003 | Chisholm et al. |
| 2004/0063880 A1 | 4/2004 | Chisholm et al. |
| 2010/0163157 A1 | 7/2010 | Milburn |
| 2011/0237692 A1 | 9/2011 | Wu et al. |
| 2011/0311802 A1 | 12/2011 | Cho |
| 2014/0065329 A1 | 3/2014 | Showers |
| 2014/0080934 A1 | 3/2014 | Wu et al. |
| 2018/0093456 A1* | 4/2018 | Van Overmeere ........ B32B 3/26 |
| 2020/0031977 A1 | 1/2020 | Chintapalli et al. |

FOREIGN PATENT DOCUMENTS

| | | |
|---|---|---|
| WO | 2010080238 A3 | 7/2010 |
| WO | WO-2019006184 A1 * | 1/2019 |

OTHER PUBLICATIONS

Zhang, et al. Polymer Nanofibers with Outstanding Thermal Conductivity and Thermal Stability: Fundamental Linkage Between Molecular Characteristics and Macroscopic Thermal Properties, Journal of Physical Chemistry C 2014 118:36, pp. 21148-21159.

Jenkins et a. "Terminology for reversible-deactivation radical polymerization previously called 'controlled' radical or 'living' radical polymerization (IUPAC Recommendations 2010," Pure Applied Chemistry, vol. 82, No. 2, pp. 483-491, 2010.

Belmares et al., "Hildebrand and Hansen Solubility Parameters from Molecular Dynamics with Applications to Electronic Nose Polymer Sensor Polymers," Wiley Periodicals 2004.

Graeme Mood et al., "A Micro Review of Reversible Addition/Fragmentation Chain Transfer (RAFT) Polymerization," Sigma-Aldrich, 8 pages.

Sebastien Perrier, "50th Anniversary Perspective: RAFT Polymerization—A User Guide," Macromolecules 2017, 50, pp. 7433-7447.

Vivek Mishra, "Living Radical Polymerization—A Review," Journal of Scientific Research, vol. 56, 2012 pp. 141-176.

* cited by examiner

METHOD TO PRODUCE COLORLESS, HIGH POROSITY, TRANSPARENT POLYMER AEROGELS

CROSS REFERENCE TO RELATED APPLICATION

This application is a divisional of, and claims priority to, U.S. patent application Ser. No. 16/046,692 filed Jul. 26, 2018, which is incorporated by reference in its entirety.

STATEMENT REGARDING FEDERALLY SPONSORED RESEARCH AND DEVELOPMENT

This invention was made with Government support under DE-AR0000734 awarded by the Department of Energy ARPA-E. The Government has certain rights in this invention.

FIELD OF THE INVENTION

This disclosure relates to polymer aerogels, more particularly to colorless, transparent, high porosity polymer aerogels.

BACKGROUND

Colorless, transparent, porous materials have uses in a variety of applications including transparent thermal insulation for windows. These three requirements all have value in these applications. Transparency is required for visibility, colorlessness leads to a high color rendering index, and higher porosity leads to improved thermal insulation. It is difficult to achieve high porosity and transparency, as these are coupled properties, and the colorlessness requirement limits the choices of available starting materials. Because pores of greater than 50 nanometers scatter visible light, only materials with a narrow pore size distribution, with pores on average below 50 nanometers can achieve high transparency and high porosity.

Currently, silica aerogels make up most of the colorless, high transparency, high porosity materials. These materials do not have narrow pore size distributions, but they can achieve transparency because they have high porosity. However, the high porosity and brittleness of silica leads to fragility. Typically, silica aerogels require supercritical $CO_2$ drying and post processing to make them stable to ambient moisture, which makes them expensive.

One alternative to silica aerogels lies in controlled radical polymerization to produce high transparency, high porosity polymer aerogels. Polymer aerogels have more mechanical robustness than silica aerogels, are intrinsically more hydrophobic, and they can be produced by ambient drying. Controlled radical polymerization processes such as stable free radical polymerization (SFRP) are used to achieve narrow pore size distributions, rendering the materials transparent.

However, while the polymer precursors themselves are colorless, stable free radical species such as nitroxide radicals are highly colored, and can lead to deep coloration in otherwise transparent, high porosity aerogels.

One could adapt other controlled radical processes such as atom transfer radical polymerization (ATRP), or reversible addition fragmentation transfer (RAFT) polymerization to produce polymer aerogels with narrow pore size distribution. However, these methods pose coloration issues like those in SFRP. ATRP uses transition metal reagents that have colored oxidation states and RAFT typically uses sulfur-based chemicals that have an intense yellow color. Removing the color in the ATRP and RAFT methods requires additional processing steps that add cost.

SUMMARY

According to aspects illustrated here, there is provided a dried polymer aerogel having a Brunauer-Emmett Teller (BET) surface area over 100 $m^2/g$, porosity of greater than 10%, visible transparency greater than 20% per 3 mm thickness, color rendering index of over 20%, and average pore size of less than 100 nm.

DETAILED DESCRIPTION OF THE EMBODIMENTS

The embodiments here include a process to make colorless, high transparency, high porosity polymer aerogels for applications such as transparent thermal insulation. As used here, a 'high transparency' or 'highly transparent' aerogel allows at least 20% of the intensity of incident light, to pass through (visible transmittance ≥20%), when using an artificial light source mimicking daylight (e.g. CIE Illuminant C), where the path length of light through the sample is 3 mm or greater. A 'highly porous' or 'high porosity' aerogel has a porosity of above 10%, with a BET (Brunauer-Emmett Teller) surface area of 100 $m^2/g$ or higher. A 'colorless' aerogel allows light transmission across most wavelengths of an artificial light source mimicking daylight (e.g. CIE Illuminant C), such that the averaged transmittance is above 20%, and is characterized by a high color rendering index in transmission, above 20% for this light source.

The embodiments here use a stable free radical control agent in conjunction with stable free nitroxide polymerization. The SFRP process alone gives transparent gels that have narrow pore size distributions but are mechanically weak and colored. The SFRP process provides a promising starting point because unlike other processes, such as the RAFT process mentioned earlier, the colored stable free radical becomes colorless when bound to another molecule.

In the embodiments here, the stable free radical control agent removes coloration by reacting with the colored chemical species introduced in the SFRP process. The stable free radical control agent has the added benefits of increasing the porosity of the aerogels, and enabling the use of methacrylate and acrylate monomers to produce colorless aerogels. These monomers are difficult substrates for traditional SFRP processes, but they are important classes of polymers in high transparency applications.

Stable free radical polymerization (SFRP) can produce transparent aerogels with moderate porosity. However, due to byproducts of the reaction, the resulting materials are often colored and unsuitable for applications where colorless materials are desired such as window insulation. Compared to conventional radical polymerization, SFRP leads to aerogels with narrower pore size distributions and higher transparency.

Conventional radical polymerization has high levels of actively growing polymer chains. Consequently, chain-chain coupling events occur frequently and the gels have a wide distribution of pore sizes. Controlled radical polymerizations obtain narrow pore size distributions because the concentration of actively growing polymer chains is low. It minimizes the chain-chain coupling events that lead to uncontrolled pore sizes.

Figure 1:
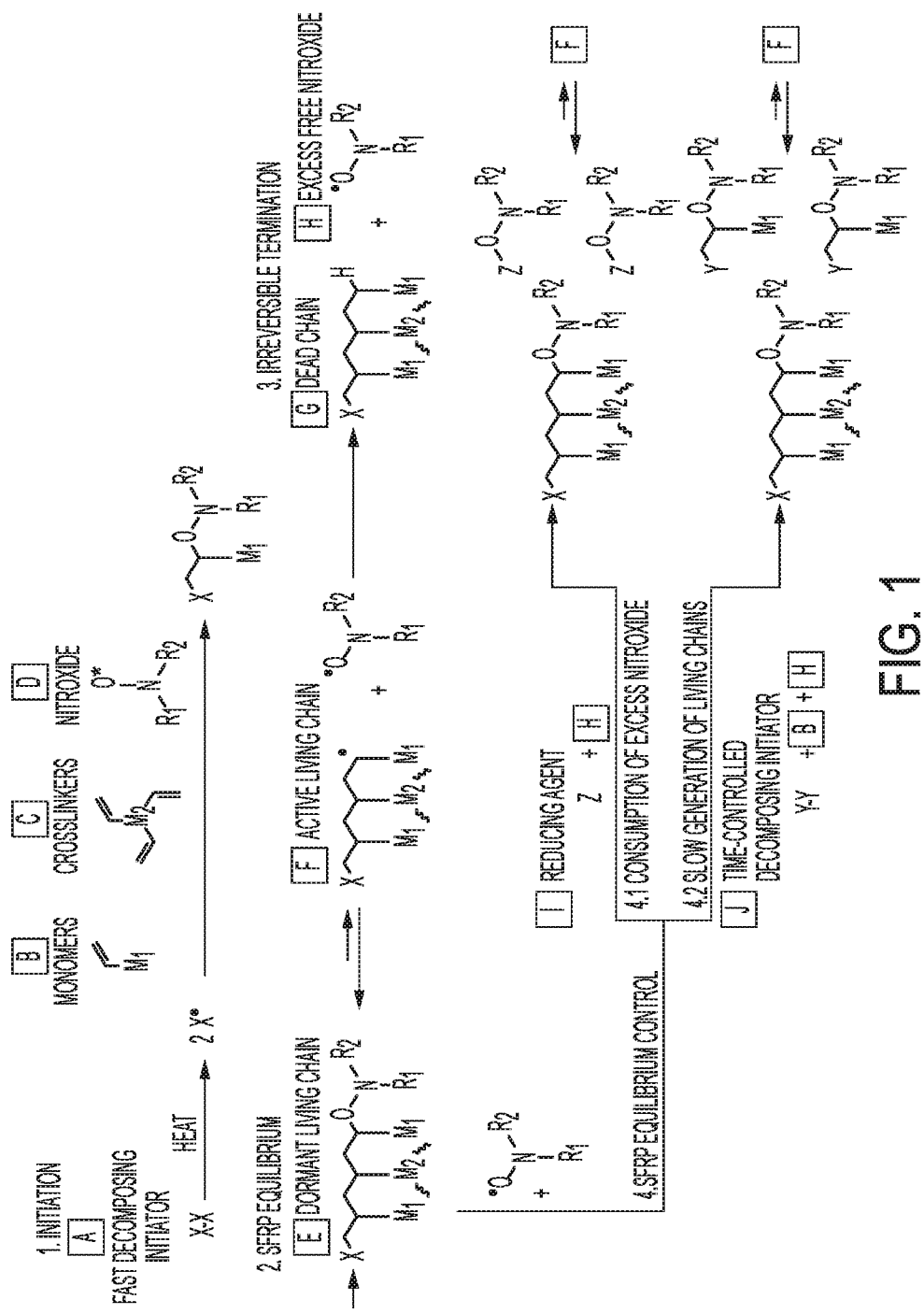
FIG. 1 shows an embodiment of a stable free radical polymerization process; the presence of a solvent is implied in all steps.

A schematic of an example SFRP process is shown in FIG. 1. One should note that this is intended merely as an explanation of one SFRP process and is not intended to limit the scope of the embodiments or the claims. The first part of the process involves initiation of the polymer chain, typically by application of heat to generate initiating radicals, shown at process A from azo, or peroxide compounds. The initiating radical reacts with monomers and crosslinkers, shown at processes B and C, to form a polymer chain. The growing polymer chain reacts reversibly with the mediating radical at process D, such as the TEMPO nitroxide (2,2,6,6-tetramethylpiperidin-1-yl)oxyl, or 2,2,6,6-tetramethylpiperidin-1-yl)oxidanyl, or $(CH_2)_3(CMe_2)_2)NO$) radical used here, and the SFRP process reaches equilibrium. When the stable radical is bound to the polymer chain, the polymer is dormant at process E, and in the state where the stable free radical is unbound, the polymer chain becomes active and undergoes chain growth, at process F. Thermal equilibrium is achieved between these two processes. The ratio of bound and unbound stable free radicals to the total number of propagating chains (active living chains F, and dormant living chains E) controls the SFRP equilibrium; if the number of stable free radicals is in excess of the number of propagating chains, process H, polymerization is too dormant, leading to inhibition, and if it is below, polymerization is too active, leading to loss of control.

In the above process, the unbound mediating radical, such as the TEMPO nitroxide, is colored. Over time, some chain-chain coupling or chain termination may occur during the reaction, leading to dead chains, show at G, and a buildup of excess stable free radical material, at H, intensifying the coloration. Degradation byproducts of the stable free radical material may also contribute color. To produce colorless materials, the process must balance the number of propagating chains and stable radicals over time, either by eliminating excess stable free radicals or by generating new propagating polymer chains so that the ratio of living, propagating chains to stable free radicals remains roughly constant for the duration of the reaction.

The embodiments here achieve this balancing by the introduction of a stable free radical control agent into the reaction. In one embodiment the stable free radical control agent consists of a reducing agent, at process I. The reducing agent reacts with the excess stable free radical material and eliminates the color. Additional benefits of decreasing the excess stable free radical material include higher monomer conversion and more mechanically robust and porous aerogels, because excess stable free radical material inhibits polymerization. The use of a reducing agent enables the production of colorless, high transparency, high porosity materials.

In another embodiment, the stable free radical control agent consists of a time-controlled decomposing initiator at process J. The time-controlled decomposing initiator slowly generates initiating radicals, which react with the remaining monomers and crosslinkers, at B and C, to initiate new propagating polymer chains. The time-controlled decomposing initiator decreases the number of stable free radicals in excess of the number of propagating chains, by generating more propagating chains over the course of the reaction. In the example of using TEMPO, the time-controlled decomposing initiator acts to decrease the amount of the excess nitroxide.

The time-controlled and slow generation aspects of the time-controlled decomposing initiator mean that the rate of radical production is slower than for the initiating radical. In one embodiment, the initiating radical may have a half-life of few minutes, and the time-controlled decomposing initiator may have a half-life on the order of 10 hours, at the reaction temperature. The half-life may change with temperature and solvent.

Figure 2:
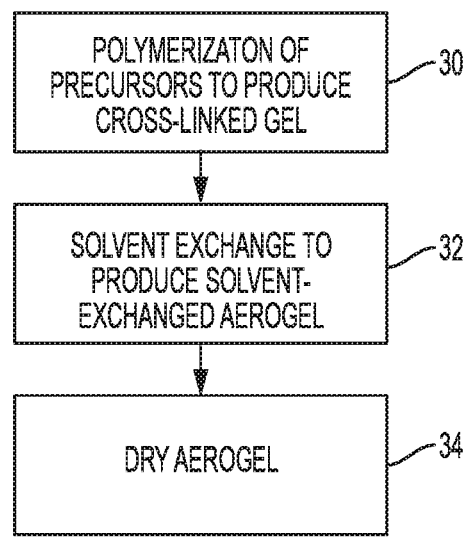
FIG. 2 shows an embodiment of a process to produce a colorless, transparent, high porosity aerogel.

FIG. 2 shows an overall flow of the embodiments. Polymerization occurs at 30, in which the solvent and reagents are mixed, deoxygenated and heated to obtain a solvated gel. In one embodiment, the polymer network initiates from a radical initiator derived from conventional thermal or photoinitiators, or from the decomposition of an alkoxyamine species (=N—O—R, where "=" indicates a double bond or single bonds to two different atoms). Thermal initiators may include azo-initiators such as AIBN, or peroxide initiators such as benzoyl peroxide. Photoinitiators may include hydroxyacetophenones or phosphine oxides. These initiators are chosen to produce radicals in a short span in the beginning of the reaction. Thermal initiators should have a half-life of less than one hour at the polymerization temperature.

The decomposition of alkoxyamine species may involve other materials. These may include BlocBuilder MA, a commercially available alkoxyamine methacrylic acid-based radical initiating species joined with a nitroxide-based reaction controller, and TEMPO alkoxyamine (=N—O—R) where the O—R bond can cleave, and R forms a radical capable of initiating polymer chains.

The stable free radical is either added as a nitroxide species (=N—O) such as TEMPO, SG1 ($C_{13}H_{29}NO_4P$), TIPNO (2,2,5-trimethyl-4-phenyl-3-azahexane-3-nitroxide), chlorobenzyl TIPNO, and hydroxy-TEMPO, or may derive from the decomposition of an alkoxyamine based on these nitroxide radicals, discussed above. Generally, the process has one source of a stable free radical (mediating radical) and at least one source of an initiating radical. The stable free radical and initiating radical each comprise 0.001-10 wt % of the precursor solution.

Figure 3:
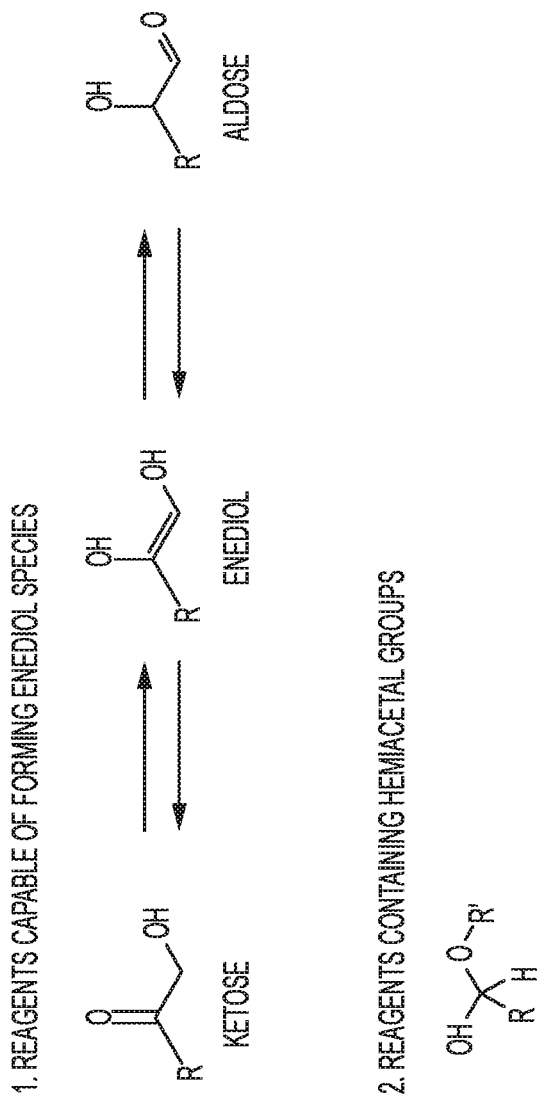
FIG. 3 shows embodiments of reducing agents.
Figure 4:
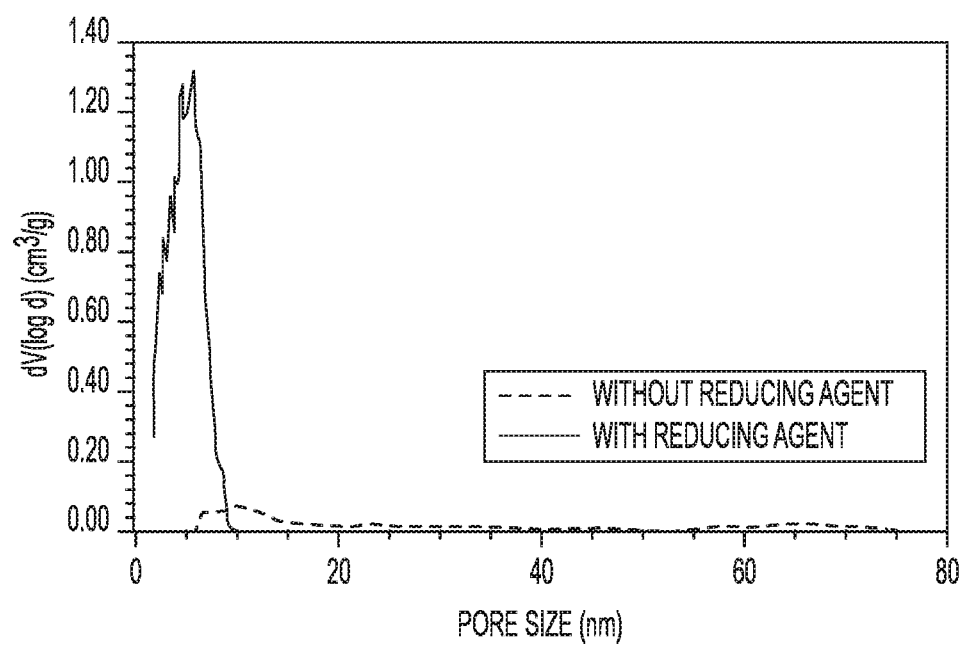
FIG. 4 shows a graph of pore size distributions in aerogels produced using stable free radical polymerization process with and without a reducing agent.
Figure 5:
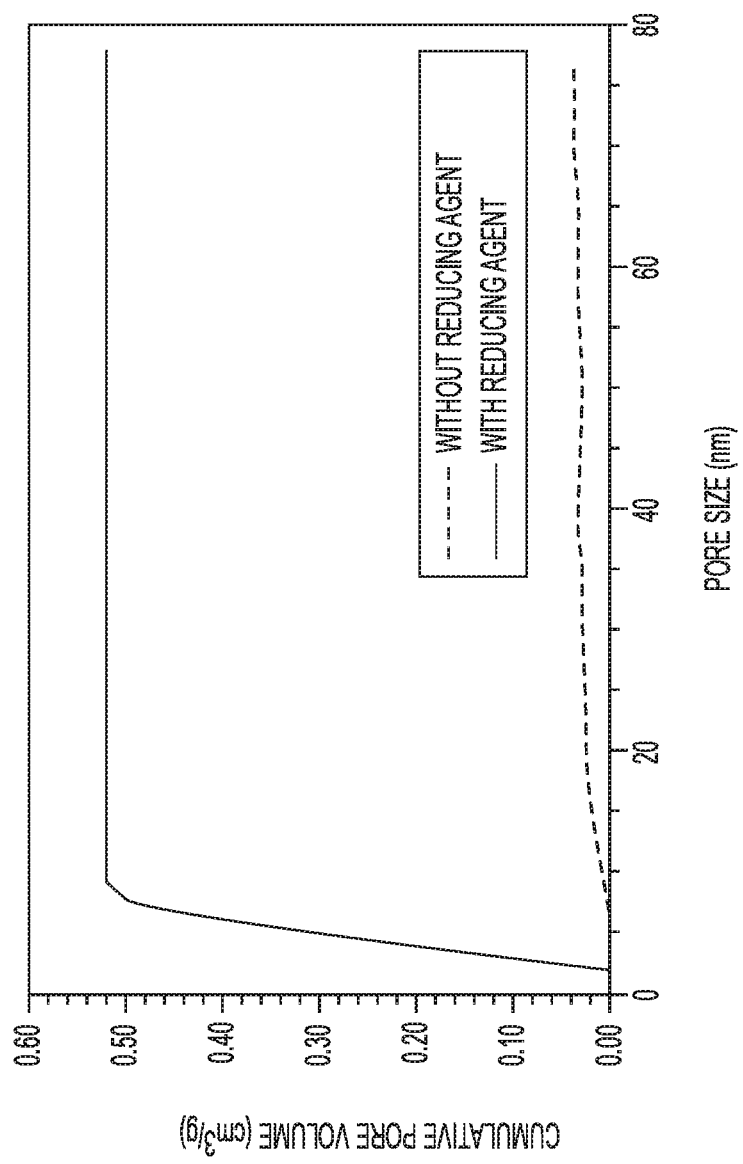
FIG. 5 shows a graph of cumulative pore size volumes in aerogels produced using stable free radical polymerization process with and without a reducing agent.

The stable free radical control agents are mixed with the polymer precursors at 30. In the embodiment where the control agent consists of a reducing agent, these may include reducing sugars such as glucose, reagents containing hemiacetal groups, hydroxyacetone, or enediol species derived from ketones and aldehydes, such as ketose and aldose sugars. Examples of hemiacetal and enediol reagents are shown in FIG. 3. The reducing agent comprises 0.001-20 wt % of the precursor solution. In the embodiment where the control agent consists of a time-controlled decomposing initiator, it may consist of dicumyl peroxide (DCP) or di-tertbutylperoxide (DTBP), 2,2-bis(tert-butylperoxy)butane, 1,1-bis(tert-butylperoxy)cyclohexane, 2,5-bis(tert-butylperoxy)-2,5-dimethylhexane, 2,5-bis(tert-butylperoxy) 2,5-dimethyl-3-hexyne, tert-butyl hydroperoxide, cumene hydroperoxide, 2,4-pentanedione peroxide, or other thermal initiators with a decomposition half-life of over 1 hour at the polymerization temperature, in the polymerization solvent. In another embodiment, the time-controlled decomposing initiator could consist of a photoinitiator, wherein the decomposition time is controlled by exposure to doses of UV light. The time-controlled decomposing initiator comprises 0.001-10 wt % of the precursor solution.

In a third embodiment, both a reducing agent and a time-controlled decomposing initiator can be used to balance the number of propagating radicals and stable radicals.

In the embodiments here, the polymers consist of mono or difunctional monomers and multifunctional crosslinkers (three or more functional groups) with groups that can undergo radical polymerization such as vinyl, acrylate, or methacrylate groups. The polymers may consist of only monomers without crosslinkers, or only crosslinkers without monomers. Monomers and difunctional monomers may include styrene, divinylbenzene, 1,6-hexanediol diacrylate, and methylmethacrylate. Cross-linkers may include trimethacryladamantane, dipenterithritol pentacrylate, trimethylolpropane trimethacrylate, and polyoligosilsequioxane octamethacrylate. The precursors can include 0-60 wt % monomers, and 0-60 wt % crosslinkers, and in total, the polymer precursors comprise 0.1-60% of the precursor solution.

The polymerization may occur in a high boiling solvent, which for the embodiments here means over 80° C., and a 'good' solvent. A 'good' solvent means a solvent that has a high affinity for the polymer network. The polymer will dissolve almost entirely in the solvent. A 'poor' solvent is one in which at least part of the polymer or precursors, or intermediates, precipitate out of solution because it does not dissolve completely. Examples of good solvents for the precursors in the preferred embodiment in Example 1, below, include acetophenone, dimethylsulfoxide, dimethylformamide, toluene, xylene, and n-methylpyrrolidone. A single solvent or a mixture of solvents may be used. The total solvent may comprise 40-99.9 wt % of the precursor solution.

Prior to heating or light exposure for the initiation step, the reaction mixture is deoxygenated. This may result from bubbling the solution with an inert gas like nitrogen or argon, using chemical species to scavenge oxygen, or by degassing the solution using vacuum or freeze-pump-thaw cycles.

After polymerization, of which deoxygenation is part, the process results in a cross-linked gel. This gel then undergoes solvent removal. In one embodiment, the gel undergoes solvent removal by solvent exchange at 32, followed by drying at 34. The solvent exchange may take many forms, but in one embodiment it first involves a good solvent, as discussed above, and then a poor solvent such as heptane or acetone. Solvent exchange in the good solvent extracts unreacted oligomers. Solvent exchange may take the form of static or flow solvent exchange. In an alternative embodiment, the solvent is not removed, instead stopping at the achievement of a cross-linked gel. The below discussion assumes the production of an aerogel, but one should note that eliminating the removal of the solvent adapts the below process to production of a gel.

After solvent exchange, drying the gel produces the aerogel. The rate and spatial uniformity of drying may be controlled to prevent cracking.

In another embodiment, the solvent removal is performed by directly drying the gel after polymerization, forgoing solvent exchange.

Example 1

To produce a colorless, high transparency, high porosity gel, precursors consisting of a monomer, a crosslinker, a reducing agent, an initiator, and a stable free radical were dissolved in a high boiling point solvent. The solution was mixed and degassed by bubbling with argon for 10 minutes. The gels were polymerized at 125° C. for 18 hours in a mold.

The gels were removed from the mold and solvent exchanged before subsequent drying steps. Gels were first solvent exchanged into a good solvent to extract any oligomers, and then exchanged into a solvent with low solvent-polymer interaction strength, before drying. Either static or flow solvent exchange can be used. In static solvent exchange, 2 grams of wet gel were placed in 10 mL of solvent for a day. Two exchanges were performed for each type of solvent.

Solvent is introduced directly or gradually. For example, a gel solvated by Solvent A can be directly immersed in Solvent B, or first immersed in a 50/50 mixture of Solvent A/Solvent B for 1 day and then immersed in 100% Solvent B. In flow solvent exchange, a reservoir of solvent is flowed across the gel to reduce solvent exchange time.

Drying the solvent exchanged gels produces the aerogels. Drying may involve either ambient or supercritical $CO_2$ drying. In ambient drying, a gel immersed in a non-solvent was dried first at room temperature and pressure, and then in vacuum. In supercritical $CO_2$ drying, gels in a non-solvent such as acetone or an alcohol are solvent exchanged with liquid $CO_2$ and supercritically dried. Supercritical $CO_2$ drying generally obtains higher porosity.

The above embodiments produce a colorless, high transparency, high porosity aerogel. In contrast, a gel produced using the same formulation but without the reducing agent produced a yellowish gel with lower porosity. The following table shows the resulting properties of the two gels.

|  | Control | With Reducing Agent | With Reducing Agent and Time-Controlled SFR Agent |
|---|---|---|---|
| Precursor Conversion (%) | 78 | 90 | 89 |
| Visible Transmittance (%) | N/A | 68 | 40 |
| CPV (cm³/g) | 0.037 | 0.52 | 1.11 |
| Porosity (%) | 16 | 30.1 | 59 |
| BET area (m²/g) | 7.9 | 659 | 936 |
| Ave. Pore Size (nm) | 10.1 | 5.9 | 8.1 |

The porosity was calculated using the measured apparent density of the gel and the density of the polymer with no pores. The cumulative pore volume (CPV), BET surface area, and pore size were measured using $N_2$ adsorption porosimetry. The aerogel produced with reducing agent has relatively high BET surface area, small pore size, high porosity and CPV, high precursor conversion, and high visible light transmittance. The aerogel produced without the reducing agent performed worse in all areas. Visible light transmittance could not be measured because the gel cracked severely.

Figure 6:
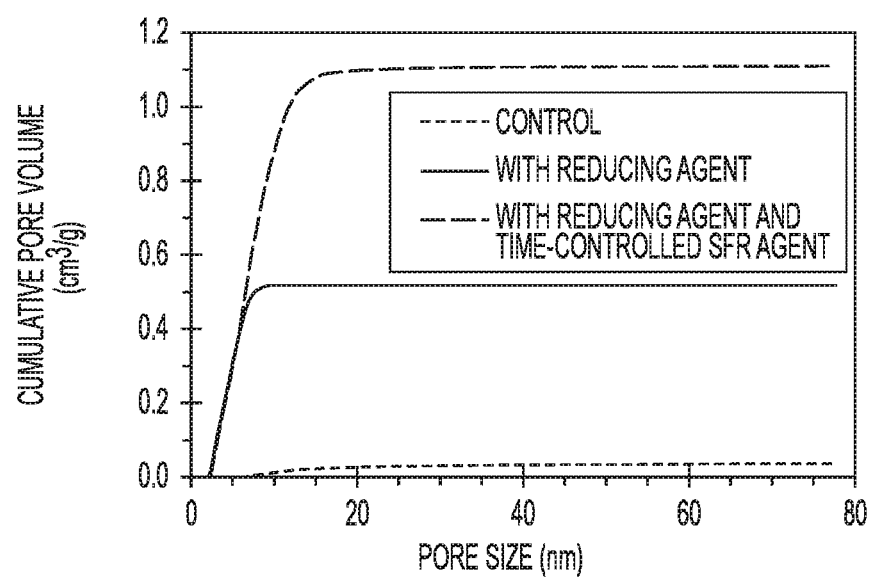
FIG. 6 shows a graph of cumulative pore size volumes in aerogels produced using stable free radical polymerization process with a reducing agent, with a reducing agent and a time controlled stable free radical control agent, and a control containing neither a reducing agent nor a time controlled stable free radical control agent.
Figure 7:
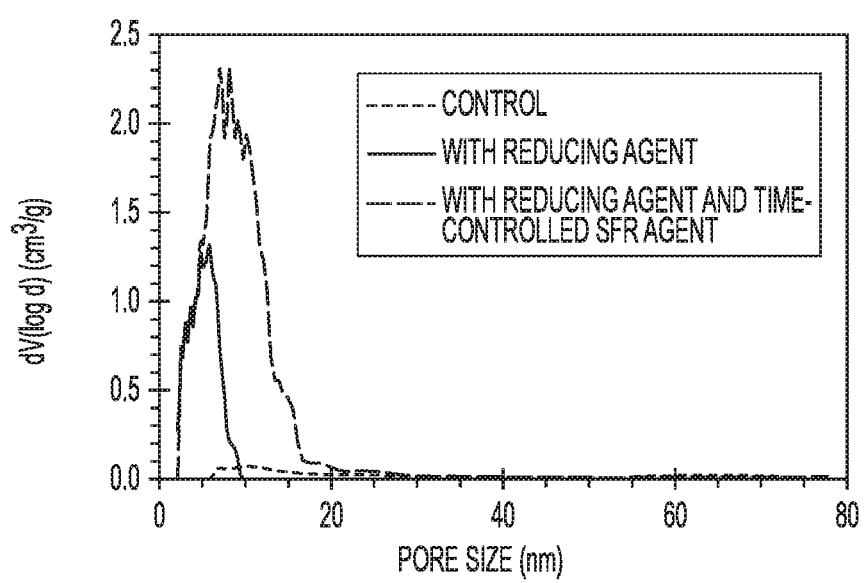
FIG. 7 shows a graph of pore size distributions in aerogels produced using stable free radical polymerization process with a reducing agent, with a reducing agent and a time controlled stable free radical control agent, and a control containing neither a reducing agent nor a time controlled stable free radical control agent.

FIG. 6 shows a graph of cumulative pore size distribution of gels, using $N_2$ adsorption porosimetry. FIG. 7 shows a graph of the pore size distributions of the gels. The aerogel produced with a reducing agent shows narrow pore size distribution and a pore size of less than 10 nm. The porosity of the aerogel produced without the reducing agent is too low to obtain a clear pore size distribution. The CPV of the aerogel with the reducing agent is far higher than the one without.

One should note that the use of the reducing agent alone will not reduce the coloration in the gels. They also should undergo deoxygenation. Deoxygenation decreases the coloration in a gel produced by either method.

The embodiments here produce colorless, high transparency, high porosity gels and aerogels. The gels and aerogels resulting from the methods herein are also embodiments of the invention. These aerogels are suitable for applications as transparent thermal insulation for windows. Using a reducing agent in the process takes advantage of the benefits of narrow pore size distribution of the SFRP process without the downsides of discoloration of materials, improves the conversion of the precursors, enables the polymerization of methylacrylate and acrylate monomers and cross-linkers, and leads to more robust gels with higher porosities. Further, the reduction in coloration occurs without adding any expensive processing steps such as solvent extraction or additional reaction steps.

In one embodiment, the solvated gel has visible transparency greater than 20% for a sample 3 mm thick or greater, or visible transparency higher than 6.66% per mm of sample, and solvent content ranging from 99.9 to 10% the volume of the gel. To measure the transparency, the gel is solvated in a solvent selected such that the refractive indices of the dense, bulk polymer network and solvent differ by more than 5%. The gel network is highly crosslinked, meaning that more than 5 wt % of the monomers in the precursor solution have two or more polymerizable groups. The gel network may have narrow pore size distribution such that the full width at half maximum of the pore size distribution is below 400 nm.

In one embodiment, the dried polymer aerogel has a BET surface area of over 100 $m^2/g$, porosity of greater than 10%, visible transparency of greater than 20% for a sample 3 mm thick or greater, or visible transparency higher than 6.66% per mm of sample, a color rendering index of greater than 20%, and an average pore size of less than 100 nm. The dried aerogel may have small pore size, with fewer than 5% of the pore volume occupied by pores larger than 100 nm.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A dried polymer aerogel having a Brunauer-Emmett Teller (BET) surface area over 100 $m^2/g$, porosity of greater than 10%, visible transparency greater than 20% per 3 mm thickness, color rendering index of over 20%, and average pore size of less than 100 nm, the aerogel including at least a portion of a stable free radical molecule in the polymer, the portion of the stable free radical molecule including nitroxide.

2. The dried polymer aerogel as claimed in claim 1, wherein the aerogel has pore sizes of less than 10 nm.

3. The dried polymer aerogel as claimed in claim 1, wherein the aerogel has less than 5% of pore volume occupied by pores larger than 100 nm.

4. The dried polymer aerogel as claimed in claim 1, wherein the aerogel is formed using more than 5 wt % of monomers having two or more polymerizable groups, wherein the aerogel is crosslinked.

5. The dried polymer aerogel as claimed in claim 1, wherein the aerogel has porosity of at least 30%.

6. The dried polymer aerogel as claimed in claim 1, wherein the aerogel has porosity of at least 59%.

7. The dried polymer aerogel as claimed in claim 1, wherein the aerogel has a BET surface area of at least 659 $m^2/g$.

8. The dried polymer aerogel as claimed in claim 1, wherein the aerogel has a pore size distribution with full width at half maximum below 400 nm.

9. The dried polymer aerogel as claimed in claim 1, wherein the nitroxide comprises one selected from the group consisting of: a nitroxide species derived from the decomposition of an alkoxyamine, 4-hydroxy-TEMPO, TEMPO, TIPNO, chlorobenzyl-TIPNO, SG1, and an alkoxyamine based on SG1 nitroxide joined to a methacrylic acid radical.

10. The dried polymer aerogel as claimed in claim 1, wherein the portion of the stable free radical molecule comprises 0.0016-16.67% by weight of the polymer aerogel.

11. The dried polymer aerogel as claimed in claim 1, the aerogel further comprising at least a portion of a initiating radical molecule bonded into the polymer aerogel.

12. The dried polymer aerogel as claimed in claim 11, wherein the portion of the initiating radical comprises one selected from the group consisting of: an initiating radical derived from a conventional thermal initiator; an initiating radical derived from a photoinitiator; and an initiating radical derived from decomposition of an alkoxyamine species.

13. The dried polymer aerogel as claimed in claim 11, wherein the portion of the initiating radical comprises 0.0016-16.67% by weight of the polymer aerogel.

14. The dried polymer aerogel as claimed in claim 1, the aerogel further comprising at least a portion of a time-controlled decomposing initiator bonded into the polymer aerogel.

15. The dried polymer aerogel as claimed in claim 14, wherein the portion of the time-controlled decomposing initiator comprises one of either a thermally-decomposing radical initiator or a mixture of thermally-decomposing initiators with half-life greater than 1 hour at the temperature of polymerization, and in a solvent of polymerization.

16. The dried polymer aerogel as claimed in claim 14, wherein the portion of the time-controlled decomposing initiator is one or more of the group consisting of: dicumyl peroxide, di-tert-butylperoxide, 2,2-bis(tert-butylperoxy) butane, 1,1-bis(tert-butylperoxy) cyclohexane, 2,5-bis(tert-butylperoxy)-2,5-dimethylhexane, 2,5-bis(tert-butylperoxy) 2,5-dimethyl-3-hexyne, tert-butylhydroperoxide, cumene hydroperoxide, or 2,4-pentanedione peroxide.

17. The dried polymer aerogel as claimed in claim 14, wherein the portion of the time-controlled decomposing initiator comprises 0.0016-16.67% by weight of the polymer aerogel.

\* \* \* \* \*